United States Patent
Park et al.

(10) Patent No.: US 10,654,957 B2
(45) Date of Patent: May 19, 2020

(54) METHOD FOR MANUFACTURING COPOLYMER AND RUBBER COMPOSITION CONTAINING THE SAME

(71) Applicant: Korea Kumho Petrochemical Co., Ltd., Seoul (KR)

(72) Inventors: June Park, Seoul (KR); Jae Young Ko, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 92 days.

(21) Appl. No.: 16/043,861

(22) Filed: Jul. 24, 2018

(65) Prior Publication Data

US 2019/0031796 A1    Jan. 31, 2019

(30) Foreign Application Priority Data

Jul. 25, 2017 (KR) .................. 10-2017-0094130

(51) Int. Cl.

| | |
|---|---|
| *C08F 236/06* | (2006.01) |
| *C08F 236/08* | (2006.01) |
| *C08F 236/10* | (2006.01) |
| *C08F 212/08* | (2006.01) |
| *C08F 4/48* | (2006.01) |
| *C08F 297/04* | (2006.01) |
| *C08F 2/06* | (2006.01) |
| *C08K 5/057* | (2006.01) |
| *C08K 5/1535* | (2006.01) |
| *C08K 5/17* | (2006.01) |
| *C08L 9/06* | (2006.01) |
| *C08F 236/04* | (2006.01) |

(52) U.S. Cl.
CPC .............. *C08F 212/08* (2013.01); *C08F 2/06* (2013.01); *C08F 4/48* (2013.01); *C08F 236/06* (2013.01); *C08F 236/10* (2013.01); *C08F 297/044* (2013.01); *C08K 5/057* (2013.01); *C08K 5/1535* (2013.01); *C08K 5/17* (2013.01); *C08L 9/06* (2013.01); *C08F 236/045* (2013.01); *C08F 236/08* (2013.01); *C08F 2410/01* (2013.01); *C08L 2312/08* (2013.01)

(58) Field of Classification Search
None
See application file for complete search history.

(56) References Cited

U.S. PATENT DOCUMENTS

2010/0210760 A1 *  8/2010  Kitagawa .............. B60C 1/0016
                                                          523/468

FOREIGN PATENT DOCUMENTS

EP           3434697 A1 *   1/2019  ............ C08F 236/10

* cited by examiner

*Primary Examiner* — Richard A Huhn
(74) *Attorney, Agent, or Firm* — Novick, Kim & Lee, PLLC; Jae Youn Kim

(57) ABSTRACT

According to an embodiment of the present invention, there is provided a method of preparing a copolymer which includes (a) polymerizing an aromatic vinyl monomer and a conjugated diene-based monomer in the presence of a solvent, a first randomizing agent, and a catalyst to prepare a first copolymer including the aromatic vinyl monomer in an amount of 15 to 40 wt %; and (b) reacting the first copolymer with one or more of a second randomizing agent different from the first randomizing agent and an additional aromatic vinyl monomer to prepare a second copolymer.

13 Claims, 3 Drawing Sheets

METHOD FOR MANUFACTURING COPOLYMER AND RUBBER COMPOSITION CONTAINING THE SAME

CROSS-REFERENCE TO RELATED APPLICATION

This application claims priority to and the benefit of Korean Patent Application No. 10-2017-0094130, filed on Jul. 25, 2017, the disclosure of which is incorporated herein by reference in its entirety.

BACKGROUND

1. Field of the Invention

The present invention relates to a method of preparing a copolymer and a rubber composition including the same.

2. Discussion of Related Art

Rubber with viscoelasticity has various applications. Special rubber products are used mainly under a dynamic condition to transmit forces or alleviate impacts. In this case, the abrasion and fatigue properties of rubber products which are continuously subjected to cyclic deformation are recognized as very important factors. In particular, since tires, power-transmitting belt products, and the like are subjected to high temperature heat and high pressure during operation thereof, satisfactory performance is required to maintain a longer lifetime.

In general, styrene-butadiene rubber (hereinafter, referred to as SBR) or butadiene rubber (hereinafter, referred to as BR) has been used as rubber for tires. SBR, which is unsaturated diene-based rubber whose main chain includes a double bond, has high chemical reactivity, is easily blended with BR, and thus has been used for a wide range of applications. However, SBR has disadvantages of a low vulcanization rate, low adhesiveness and elasticity, high dynamic heat buildup, and the like.

BR has mainly a high proportion of cis bonds (over 95%), exhibits high abrasion resistance, low temperature resistance, and excellent dynamic properties due to high elasticity compared to SBR, and thus is used as a material requiring abrasion resistance. However, when used as raw material rubber, BR exhibits poor cold flow, is easily subjected to a chipping or cutting process which may be disastrous for extreme tires, and exhibits poor rolling processability. Therefore, BR is rarely used alone.

In order to compensate for the disadvantages of SBR, solution styrene-butadiene rubber (hereinafter, referred to as SSBR) is prepared through solution polymerization of styrene and butadiene in an organic solvent using an alkyllithium catalyst instead of emulsion polymerization which was conventionally performed to synthesize SBR. SSBR has excellent viscoelasticity compared to the existing SBR and is capable of adjusting cold flow at room temperature, and thus may compensate for the disadvantages of BR and may promote improvement of stability and fuel efficiency of an automobile when used in a rubber composition, particularly, a tire.

In order to improve the characteristics of a rubber composition, the content of 1,2-vinyl (hereinafter, referred to as vinyl) or styrene monomer (hereinafter, referred to as SM) used as a monomer for copolymerization included in the molecular chain of SSBR is generally adjusted to increase. However, when the content of SM is increased, fuel efficiency of a tire is rapidly degraded, and low temperature performance is adversely affected. Therefore, it is known that increasing the content of vinyl instead of SM is desirable. This is to improve braking performance as opposed to fuel efficiency by converting kinetic energy of an automobile into heat energy so that kinetic energy is rapidly consumed upon braking, and to increase viscosity as opposed to elasticity for improving fuel efficiency.

High-viscosity SSBR containing a large amount of vinyl generally has high elasticity due to its high molecular weight, and thus exhibits a low consumption rate of fuel when used for tire tread. However, the SSBR has poor processability due to its high molecular weight, and when the SSBR is blended with an inorganic filler such as carbon black or silica, Mooney viscosity of a compound is rapidly increased, and thus it is difficult to perform subsequent processes. Also, due to strong interactions between inorganic fillers and low compatibility between SSBR and BR, it is difficult to obtain a rubber composition with high bonding strength in the blending process.

Therefore, there is a need to develop a copolymer which not only has enhanced compatibility or usability in combination with SBR, BR, and a reinforcing agent upon the preparation of a rubber composition, but also improves the mechanical and dynamic properties of a rubber composition prepared therefrom.

SUMMARY OF THE INVENTION

The present invention is designed to solve the problems of the prior art, and it is an object of the present invention to provide a method of preparing a copolymer having excellent compatibility with styrene-butadiene rubber (SBR), butadiene rubber (BR), and a reinforcing agent, and a rubber composition including the same.

According to one aspect of the present invention, there is provided a method of preparing a copolymer, which includes (a) polymerizing an aromatic vinyl monomer and a conjugated diene-based monomer in the presence of a solvent, a first randomizing agent, and a catalyst to prepare a first copolymer including the aromatic vinyl monomer in an amount of 15 to 40 wt %; and (b) reacting the first copolymer with one or more of a second randomizing agent different from the first randomizing agent and an additional aromatic vinyl monomer to prepare a second copolymer.

According to an embodiment, the solvent may be selected from the group consisting of benzene, methylbenzene, heptane, n-hexane, cyclohexane, and a mixture of two or more thereof.

According to an embodiment, the first randomizing agent may be selected from the group consisting of ditetrahydrofurylpropane (DTHFP), tetramethylethylenediamine (TEMDA), sodium t-amylate (STA), and a mixture of two or more thereof.

According to an embodiment, the catalyst may be selected from the group consisting of ethyllithium, propyllithium, isopropyllithium, n-butyllithium, sec-butyllithium, pentyllithium, hexyllithium, cyclohexyllithium, phenyllithium, and a mixture of two or more thereof.

According to an embodiment, the aromatic vinyl monomer may be selected from the group consisting of styrene, α-methylstyrene, α-ethylstyrene, p-methylstyrene, vinyltoluene, and a mixture of two or more thereof.

According to an embodiment, the conjugated diene-based monomer may be selected from the group consisting of 1,3-butadiene, 2,3-dimethyl-1,3-butadiene, piperylene, 3-butyl-1,3-octadiene, isoprene, 2-phenyl-1,3-butadiene, and a mixture of two or more thereof.

According to an embodiment, the second randomizing agent may be selected from the group consisting of tert-butoxyethoxy ethane, tetrahydrofuran, triethylamine, and a mixture of two or more thereof.

According to an embodiment, the second copolymer may include a first part consisting of the first copolymer and a second part excluding the first part, and the second part may include the aromatic vinyl monomer in an amount of 30 to 40 wt %.

According to an embodiment, a weight ratio of the aromatic vinyl monomer included in the first part and the second part may be 1:1.2 to 2.0.

According to an embodiment, the aromatic vinyl monomer may be used in the step (a) in an amount of 30 to 50 wt % with respect to the total weight of the aromatic vinyl monomer used in the steps (a) and (b).

According to an embodiment, the method may further include (c) reacting the second copolymer with a silane-based coupling agent after the step (b).

According to an embodiment, the silane-based coupling agent may be selected from the group consisting of 3-glycidoxypropyl dimethyl dimethoxysilane (GPDMS), dimethyl dichlorosilane, trimethyl chlorosilane, methyl dichlorosilane, methyl trichlorosilane, phenyl trichlorosilane, vinyl trichlorosilane, and a mixture of two or more thereof.

According to another aspect of the present invention, there is provided a rubber composition which includes a copolymer prepared by the above-described method; and styrene-butadiene rubber and butadiene rubber.

According to an embodiment, the rubber composition may satisfy the following Equation:

$$y=ax+b \qquad \text{<Equation>}$$

In the Equation, x is a content (parts by weight) of the copolymer of the rubber composition, y is a glass transition temperature (Tg) of the rubber composition, and $0.7 \leq a'/a \leq 1.3$ and $1b'-b1 \leq 0.9$ are satisfied (a' and b' each are a theoretical value derived by the Fox equation for the rubber composition).

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
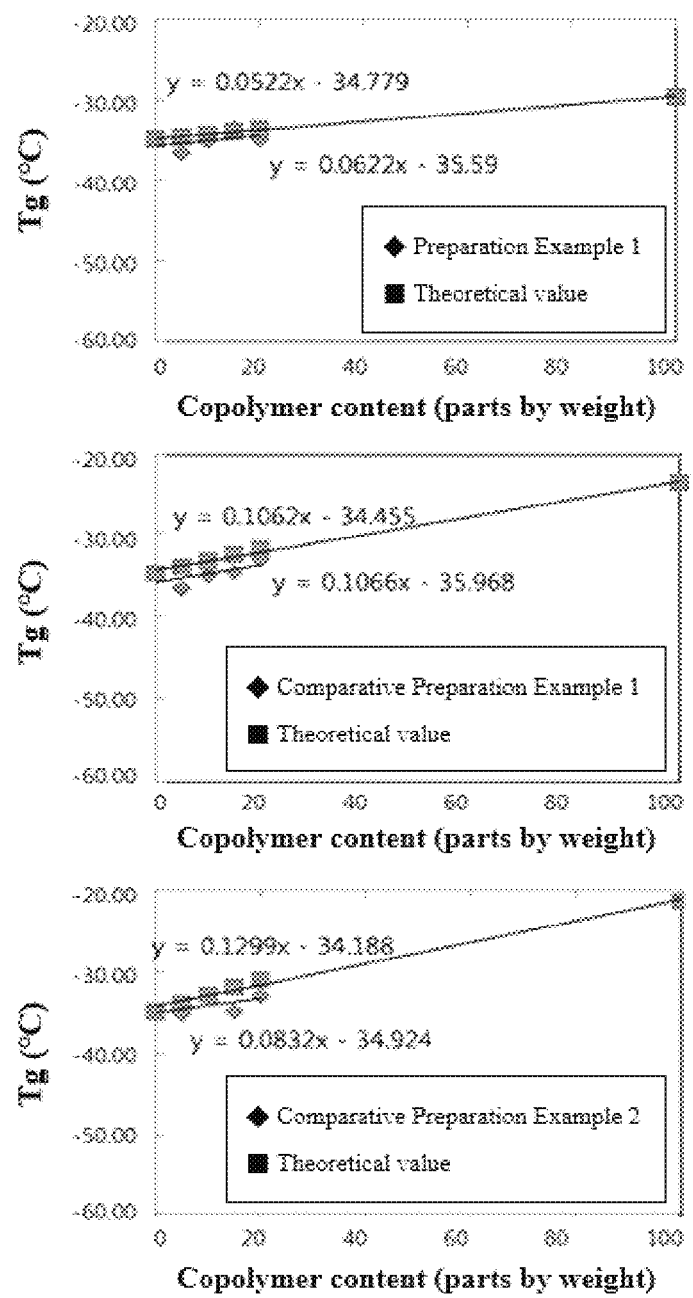
FIG. 1 is a set of graphs of differential scanning calorimetry (DSC) analysis results of the rubber compositions according to Preparation Example 1 of the present invention and Comparative Preparation Examples 1 and 2, which are applied to the Fox equation.

Hereinafter, exemplary embodiments of the present invention will be described in detail with reference to accompanying drawings. However, it should be understood that the present invention can be implemented in various forms, and that it is not intended to limit the present invention to the exemplary embodiments.

Throughout the specification, a certain part being "connected" to one other part means that the certain part is "directly connected" to the other part or that the certain part is "indirectly connected" to the other part through another member interposed between the two parts. Also, a certain part "including" a certain element signifies that the certain part may further include, instead of excluding, another element unless particularly indicated otherwise.

According to one aspect of the present invention, there is provided a method of preparing a copolymer, which includes (a) polymerizing an aromatic vinyl monomer and a conjugated diene-based monomer in the presence of a solvent, a first randomizing agent, and a catalyst to prepare a first copolymer including the aromatic vinyl monomer in an amount of 15 to 40 wt %; and (b) reacting the first copolymer with one or more of a second randomizing agent different from the first randomizing agent and an additional aromatic vinyl monomer to prepare a second copolymer.

The first copolymer is reacted with one or more of a second randomizing agent different from the first randomizing agent and an additional aromatic vinyl monomer to prepare a second copolymer, so that the content of the aromatic vinyl monomer in one part, preferably, a second part is adjusted, and thus a copolymer with microstructural left-right asymmetry may be prepared from the step (b).

The solvent may be selected from the group consisting of benzene, methylbenzene, heptane, n-hexane, cyclohexane, and a mixture of two or more thereof, and preferably is cyclohexane, but the present invention is not limited thereto.

The first randomizing agent may be selected from the group consisting of ditetrahydrofurylpropane (DTHFP), tetramethylethylenediamine (TEMDA), sodium t-amylate (STA), and a mixture of two or more thereof, and preferably is DTHFP, but the present invention is not limited thereto. The first randomizing agent may adjust the rate of polymerization of an aromatic vinyl monomer and a conjugated diene-based monomer. In general, the polymerization rate of a conjugated diene-based monomer is about 10 times faster than the polymerization rate of an aromatic vinyl monomer. In this case, the first randomizing agent including a vinyl group may prevent the unilateral polymerization of a conjugated diene-based monomer and relatively promote the polymerization of an aromatic vinyl monomer.

When only the conjugated diene-based monomer is polymerized, it is likely to produce polybutadiene having a low degree of polymerization and a low molecular weight, and in this case, a molecular chain easily moves to lower a glass transition temperature (Tg), resulting in a rubber composition with degraded elasticity. In this case, when copolymerization with an aromatic vinyl monomer having a large atomic group such as a benzene nucleus occurs, an entangled molecular chain is improved and a degree of polymerization is also increased, resulting in enhanced performance in terms of aging resistance, weather resistance, friction resistance, oil resistance, and the like. On the other hand, when only the aromatic vinyl monomer is polymerized, a molecular chain may become large and heavy, making it difficult for a molecular chain to move, and the polymerization rate may be slowed down.

The catalyst may be selected from the group consisting of ethyllithium, propyllithium, isopropyllithium, n-butyllithium, sec-butyllithium, pentyllithium, hexyllithium, cyclohexyllithium, phenyllithium, and a mixture of two or more thereof, and preferably is n-butyllithium and/or ethyllithium, but the present invention is not limited thereto.

The catalyst may be used as an anionic initiator. Since a bonding distance between an alkyl group and lithium is far away, a lithium cation and an anionic alkyl group may be easily separated, and a carbon atom present in the anionic alkyl group is derived as a carbanion which is anionic. The carbanion breaks a carbon-carbon double bond present in the aromatic vinyl monomer or the conjugated diene-based monomer to initiate polymerization, and thus a copolymer may grow.

The aromatic vinyl monomer may be selected from the group consisting of styrene, α-methylstyrene, α-ethylstyrene, p-methylstyrene, vinyltoluene, and a mixture of two or more thereof, and preferably is styrene, α-methylstyrene and/or α-ethylstyrene, but the present invention is not limited thereto.

The conjugated diene-based monomer may be selected from the group consisting of 1,3-butadiene, 2,3-dimethyl-1,3-butadiene, piperylene, 3-butyl-1,3-octadiene, isoprene, 2-phenyl-1,3-butadiene, and a mixture of two or more thereof, and preferably is 1,3-butadiene, but the present invention is not limited thereto.

The second randomizing agent may be selected from the group consisting of tert-butoxyethoxy ethane, tetrahydrofuran, triethylamine, and a mixture of two or more thereof, and preferably is tert-butoxyethoxy ethane, but the present invention is not limited thereto. The second randomizing agent may perform the same function as the first randomizing agent, but may be different from the first randomizing agent to form a second part asymmetric with a first part. Also, an aromatic vinyl monomer are further added without further addition of a conjugated diene-based monomer to reduce a relative amount of conjugated diene-based monomer in a monomer mixture, and thus the amount of a vinyl group in a molecular chain may be adjusted. In this case, as an initial ratio of the aromatic vinyl monomer to the conjugated diene-based monomer is lower, the amount of aromatic vinyl monomer further added may be increased.

The second copolymer (asymmetric block copolymer) may include a first part consisting of the first copolymer and a second part excluding the first part, and the second part may include the aromatic vinyl monomer in an amount of 30 to 40 wt %, but the present invention is not limited thereto. When the second part includes the aromatic vinyl monomer in an amount of less than 30 wt % or greater than 40 wt %, asymmetry of the first part and the second part is out of an appropriate asymmetry range, and thus compatibility of the copolymer with SBR, BR, and a reinforcing agent may be degraded.

A weight ratio of the aromatic vinyl monomers included in the first part and the second part may be 1:1.2 to 2.0, preferably, 1:1.4 to 1.8, but the present invention is not limited thereto. When a weight ratio of the aromatic vinyl monomers included in the first part and the second part is 1:less than 1.2 or greater than 2.0, asymmetry of the first part and the second part is out of an appropriate asymmetry range, and thus compatibility of the copolymer with SSBR, BR, and a reinforcing agent may be degraded.

By forming a block copolymer including left-right asymmetric first and second parts, compatibility of the copolymer with SBR, BR, and a reinforcing agent may be enhanced. Also, when a difference in content of a vinyl group produced by polymerizing the aromatic vinyl monomer and the conjugated diene-based monomer between the first part and the second part is less than 10 wt %, compatibility of the copolymer with SBR, BR, and a reinforcing agent is favorable.

Asymmetry of the first part and the second part provides compatibility with SBR and BR according to a difference in content of the aromatic vinyl monomer in each part. In this case, when a difference in content of the aromatic vinyl monomer in the first part and the second part is out of the above range to excessively increase or decrease asymmetry, compatibility of the copolymer with SBR and BR may be degraded upon the preparation of a rubber composition.

The aromatic vinyl monomer may be used in the step (a) in an amount of 30 to 50 wt % with respect to the total weight of the aromatic vinyl monomer used in the steps (a) and (b), and preferably is 35 to 45 wt %, but the present invention is not limited thereto. When the aromatic vinyl monomer is used in the step (a) in an amount of less than 30 wt % or greater than 50 wt %, asymmetry of the first part and the second part is out of an appropriate asymmetry range, and thus compatibility of the copolymer with SBR, BR, and a reinforcing agent may be degraded.

After the step (b), (c) reacting the second copolymer with a silane-based coupling agent may be further included. That is, the end of the molecular chain of the second copolymer may be chemically modified through coupling.

The silane-based coupling agent may be selected from the group consisting of 3-glycidoxypropyl dimethyl dimethoxysilane (GPDMS), dimethyl dichlorosilane, trimethyl chlorosilane, methyl dichlorosilane, methyl trichlorosilane, phenyl trichlorosilane, vinyl trichlorosilane, and a mixture of two or more thereof, and preferably is 3-glycidoxypropyl dimethyl dimethoxysilane and/or trimethyl chlorosilane, but the present invention is not limited thereto. The silane-based coupling agent may enhance compatibility of the copolymer with a reinforcing agent, particularly, silica.

According to another aspect of the present invention, there is provided a rubber composition which includes a copolymer prepared by the above-described method; and styrene-butadiene rubber and butadiene rubber.

The microstructural left-right asymmetry of the first part and the second part of the copolymer may serve as a link for lowering interfacial resistance of each of SBR and BR upon the preparation of the rubber composition. Accordingly, compatibility between components of the rubber composition is enhanced, and bonding strength between SBR, BR, and a reinforcing agent is also increased, and thus mechanical properties, abrasion properties, and dynamic properties of the rubber composition may be enhanced.

The rubber composition may satisfy the following Equation:

$$y=ax+b \qquad \text{<Equation>}$$

In the Equation, x is a content (parts by weight) of the copolymer of the rubber composition, y is a glass transition temperature (Tg) of the rubber composition, and $0.7 \leq a'/a \leq 1.3$ and $1b'-b1 \leq 0.9$ are satisfied (a' and b' each are a theoretical value derived by the Fox equation for the rubber composition).

The Fox equation is an empirical formula that illustrates the relationship between molecular weight and glass transition temperature in a polymer system. The rubber composition including the copolymer, SBR, and BR exhibits characteristics and a behavior close to, preferably, substantially coincident with a theoretical line for compatibility derived by the Fox equation. Specifically, when the a'/a satisfies a'/a<0.7 or a'/a>1.3, a difference in slope from a theoretical line for compatibility derived by the Fox equation becomes large, and when the 1b'−b1 satisfies 1b'−b1>0.9, a theoretical line for compatibility derived by the Fox equation becomes distant from the y-intercept, and thus the graph of a glass transition temperature of the rubber composition is apart from a theoretical line for compatibility derived by the Fox equation, which indicates that compatibility of each component of the rubber composition is degraded.

Among indexes capable of evaluating the compatibility of the rubber composition, the transitional aspect of a glass transition temperature is examined through a DSC analysis. When components of the rubber composition have high compatibility, a single glass transition temperature is exhibited, and when components of the rubber composition have low compatibility, varying glass transition temperatures are exhibited according to components of the rubber composition, and thus a separate linear graph or a curved graph rather than a straight line which is a graph of a linear function appears.

Hereinafter, embodiments of the present invention will be described in detail.

Example 1

(a) Preparation of First Copolymer 2,490 g of cyclohexane as a solvent, 50.3 g of styrene as an aromatic vinyl monomer, 274.3 g of 1,3-butadiene as a conjugated diene-based monomer, and 7.2 g of ditetrahydrofurylpropane (DTHFP) as a first randomizing agent were charged in a 10 L reactor under a nitrogen atmosphere, and a mixture was heated at 55° C. while stirring. Afterward, 6.4 g of n-butyllithium as a catalyst was added dropwise to the mixture such that the catalyst was reacted with impurities until the mixture turned yellow. Then, 8.8 g of n-butyllithium was added immediately using a pump to initiate polymerization.

A reaction temperature was raised at a rate of 1° C./min until a final polymerization temperature reached 85° C. When a temperature of the mixture reached 85° C., the mixture was stirred for 5 minutes to induce a reaction.

(b) Preparation of Second Copolymer (Asymmetric Block Copolymer)

64 g of styrene was further added in situ to the mixture prepared in the step (a) and reacted for 15 minutes.

Afterward, 0.1 g of 3-glycidoxypropyl dimethyl dimethoxysilane (GPDMS) was added as a silane-based coupling agent to induce a coupling reaction of a portion of a copolymer chain. After waiting an additional 5 minutes for the completion of the coupling reaction, the reaction was finally terminated. A final mixture was cooled to room temperature and stabilized with 4.1 g of butylated hydroxytoluene (BHT), and then a copolymer was recovered from the mixture through steam stripping. The copolymer thus recovered was dried in an oven set to 70° C. for 30 minutes to obtain a copolymer.

Example 2

A copolymer was obtained in the same manner as in Example 1 except that 64 g of styrene and 4 g of tert-butoxyethoxy ethane as a second randomizing agent were further added in the step (b).

Comparative Example 1

(a) Preparation of First Copolymer 2,490 g of cyclohexane as a solvent, 114.3 g of styrene as an aromatic vinyl monomer, 145.7 g of 1,3-butadiene as a conjugated diene-based monomer, and 7.2 g of DTHFP as a first randomizing agent were charged in a 10 L reactor under a nitrogen atmosphere, and a mixture was heated at 55° C. while stirring. Afterward, 6.4 g of n-butyllithium as a catalyst was added dropwise to the mixture such that the catalyst was reacted with impurities until the mixture turned yellow. Then, 8.8 g of n-butyllithium was added immediately using a pump to initiate polymerization.

A reaction temperature was raised at a rate of 1° C./min until a final polymerization temperature reached 85° C. When a temperature of the mixture reached 85° C., the mixture was stirred for 5 minutes to induce a reaction.

(b) Preparation of Second Copolymer (Asymmetric Block Copolymer)

140 g of 1,3-butadiene was further added in situ to the mixture prepared in the step (a) and reacted for 15 minutes.

Afterward, 0.1 g of GPDMS was added as a silane-based coupling agent to induce a coupling reaction of a portion of a copolymer chain. After waiting an additional 5 minutes for the completion of the coupling reaction, the reaction was finally terminated. A final mixture was cooled to room temperature and stabilized with 4.1 g of BHT, and then a copolymer was recovered from the mixture through steam stripping. The copolymer thus recovered was dried in an oven set to 70° C. for 30 minutes to obtain a copolymer.

Comparative Example 2

A copolymer was obtained in the same manner as in Comparative Example 1 except that 244.1 g of 1,3-butadiene was charged in the step (a), and 50 g of 1,3-butadiene was further added in the step (b).

The content of styrene included in a first part and a second part of each of the copolymers according to Examples 1 and 2 and Comparative Examples 1 and 2 was measured, and results thereof are shown in the following Table 1. In this case, the content of styrene was measured using an NMR spectrometer.

TABLE 1

| Classification | Example 1 | Example 2 | Comparative Example 1 | Comparative Example 2 |
|---|---|---|---|---|
| First part | 18.6 | 25.7 | 53.5 | 41.3 |
| Second part | 32.3 | 36.6 | 20.8 | 10.2 |
| Second copolymer (asymmetric block copolymer) | 27.2 | 30.4 | 30.3 | 31.0 |

(units: % by weight)

When Examples 1 and 2 and Comparative Examples 1 and 2 were compared, a weight ratio of styrene included in a first part and a second part was 1:1.7 and 1:1.4, respectively, in the case of Examples 1 and 2, and was 1:0.4 and 1:0.2, respectively, in the case of Comparative Examples 1 and 2.

It can be confirmed that the weight ratio of styrene included in the first part was 40 wt % or more in the case of both Comparative Example 1 and Comparative Example 2. Generally, the content of styrene included in SBR used in tire tread which is a rubber composition is 40 wt %, and when the weight ratio of styrene included in the first part or the second part of the copolymer is 40 wt % or more, the content of styrene included in the first part or the second part is increased, and thus asymmetry of the first part or the second part may be out of an appropriate asymmetry range. In an embodiment of the present invention, the content of styrene included in a first part and a second part of a copolymer is adjusted to 40 wt % or less, so that a copolymer with excellent compatibility with SBR, BR, and a reinforcing agent may be prepared.

Preparation Examples and Comparative Preparation Examples: Preparation of Tire Tread Tire tread, which is a rubber composition, including each of the copolymers according to Examples and Comparative Examples, SBR (SLR6430, Styron), SiO$_2$, BR (KBR-01, Kumho Petrochemical), and a reinforcing agent was prepared. Components in the tire tread and contents thereof are shown in the following Table 2.

TABLE 2

| Component | Preparation Example 1 | Preparation Example 2 | Comparative Preparation Example 1 | Comparative Preparation Example 2 | Comparative Preparation Example 3 |
|---|---|---|---|---|---|
| SBR | 72 | 72 | 80 | 72 | 72 |
| BR | 20 | 20 | 20 | 20 | 20 |
| Example 1 | 8 | — | — | — | — |
| Example 2 | — | 8 | — | — | — |
| Comparative Example 1 | — | — | — | 8 | — |
| Comparative Example 2 | — | — | — | — | 8 |
| Silicon oxide | 80 | 80 | 80 | 80 | 80 |
| Zinc oxide | 3 | 3 | 3 | 3 | 3 |
| Stearic acid | 2 | 2 | 2 | 2 | 2 |
| Carbon black | 1 | 1 | 1 | 1 | 1 |
| Sulfur | 1.5 | 1.5 | 1.5 | 1.5 | 1.5 |
| Vulcanization accelerator | 1.8 | 1.8 | 1.8 | 1.8 | 1.8 |

(units: parts by weight)

The properties of tire tread according to Preparation Examples 1 and 2 and Comparative Preparation Examples 1 to 3 were evaluated, and results thereof are shown in the following Table 3.

TABLE 3

| Classification | Preparation Example 1 | Preparation Example 2 | Comparative Preparation Example 1 | Comparative Preparation Example 2 | Comparative Preparation Example 3 |
|---|---|---|---|---|---|
| Mooney viscosity | 107 | 107 | 100 | 103 | 102 |
| Payne effect | 101 | 101 | 100 | 100 | 100 |
| Hardness | 103 | 101 | 100 | 100 | 100 |
| Modulus upon elongation by 300% | 101 | 101 | 100 | 96 | 97 |
| Tensile strength | 112 | 111 | 100 | 105 | 104 |
| Elongation rate | 113 | 113 | 100 | 110 | 111 |
| DIN abrasion | 102 | 102 | 100 | 97 | 98 |
| Slip resistance | 105 | 104 | 100 | 102 | 101 |
| Elastic rebound | 104 | 103 | 100 | 103 | 101 |

Referring to Table 1, there is no significant difference in content of styrene in the second copolymers (asymmetric block copolymers) according to Examples 1 and 2 and Comparative Examples 1 and 2. However, it is possible to experimentally confirm, through Table 3, a difference in properties of the rubber composition according to the content ratio of the first part and the second part upon preparation of the rubber composition.

It can be confirmed that Preparation Examples 1 and 2 and Comparative Preparation Examples 2 and 3, in which a copolymer was added, were improved in terms of Mooney viscosity, tensile strength, elongation rate, slip resistance, and elastic rebound compared to Comparative Preparation Example 1 in which a copolymer was not added. However, compared to Comparative Preparation Examples 2 and 3 which were degraded in terms of modulus upon elongation by 300% and DIN abrasion, Preparation Examples 1 and 2 were improved in terms of all of mechanical properties, abrasion properties, and dynamic properties.

FIG. 1 is a set of graphs of differential scanning calorimetry (DSC) analysis results of the rubber compositions according to Preparation Example 1 and Comparative Preparation Examples 1 and 2, which are applied to the Fox equation. A glass transition temperature was measured according to the copolymer content through a DSC analysis. In the case of Preparation Example 1, a' is 0.0522 and b' is −34.779 according to the theoretical linear equation for compatibility derived by the Fox equation. In this case, Preparation Example 1, in which a is 0.0622, and b is −35.59, satisfies both the slope and y-intercept ranges with respect to the theoretical linear equation for compatibility derived by the Fox equation, and thus exhibits a graph similar to that of the theoretical linear equation for compatibility derived by the Fox equation. Accordingly, it can be experimentally confirmed that the copolymer according to an example of the present invention is added to form a SSBR-copolymer-BR structure, and thus a single glass transition temperature (Tg) is exhibited.

In the case of Comparative Preparation Example 1, a' is 0.1062 and b' is −34.455 according to the theoretical linear equation for compatibility derived by the Fox equation. In this case, Comparative Preparation Example 1, in which a, the slope of the line, is 0.1066 and b is −35.968, satisfies the slope range of 0.7≤a'/a≤1.3, but is out of the y-intercept range, and thus exhibits a graph with a low degree of similarity to that of the theoretical linear equation for compatibility derived by the Fox equation. Accordingly, it can be judged that compatibility between SSBR and BR is degraded due to the absence of the copolymer.

In the case of Comparative Preparation Example 2, a' is 0.1299 and b' is −34.188 according to the theoretical linear equation for compatibility derived by the Fox equation. In this case, Comparative Preparation Example 2, in which a is 0.0832 and b is −34.924, does not satisfy both the slope and y-intercept ranges with respect to the theoretical linear equation for compatibility derived by the Fox equation, and thus exhibits a graph with a low degree of similarity to that of the theoretical linear equation for compatibility derived by the Fox equation. Accordingly, it can be experimentally confirmed that the copolymer prepared with addition of one or more of a second randomizing agent different from a first randomizing agent and an additional aromatic vinyl monomer according to the present invention has excellent compatibility with SSBR, BR, and a reinforcing agent compared to an existing copolymer prepared with further addition of a conjugated diene-based monomer.

Figure 2A:
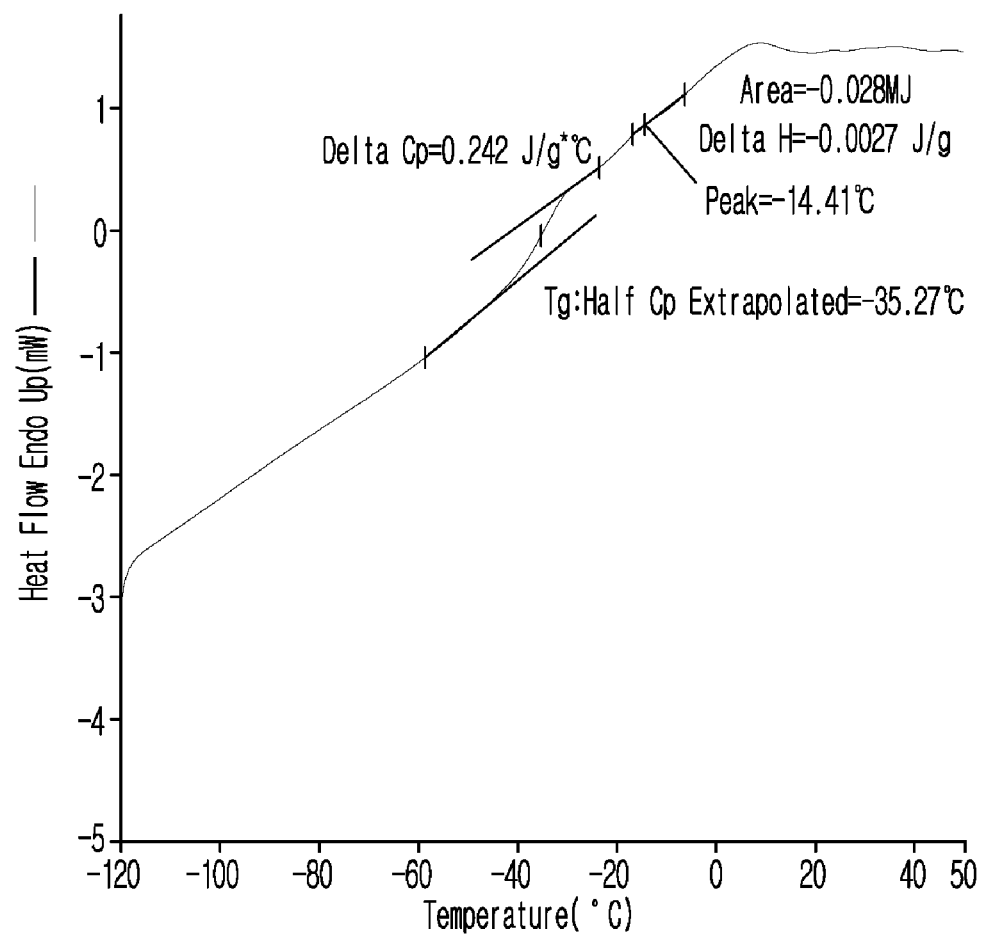
FIG. 2 is a set of graphs of DSC analysis results of the rubber compositions according to (a) Preparation Example 1 of the present invention and (b) Comparative Preparation Example 1.
Figure 2B:
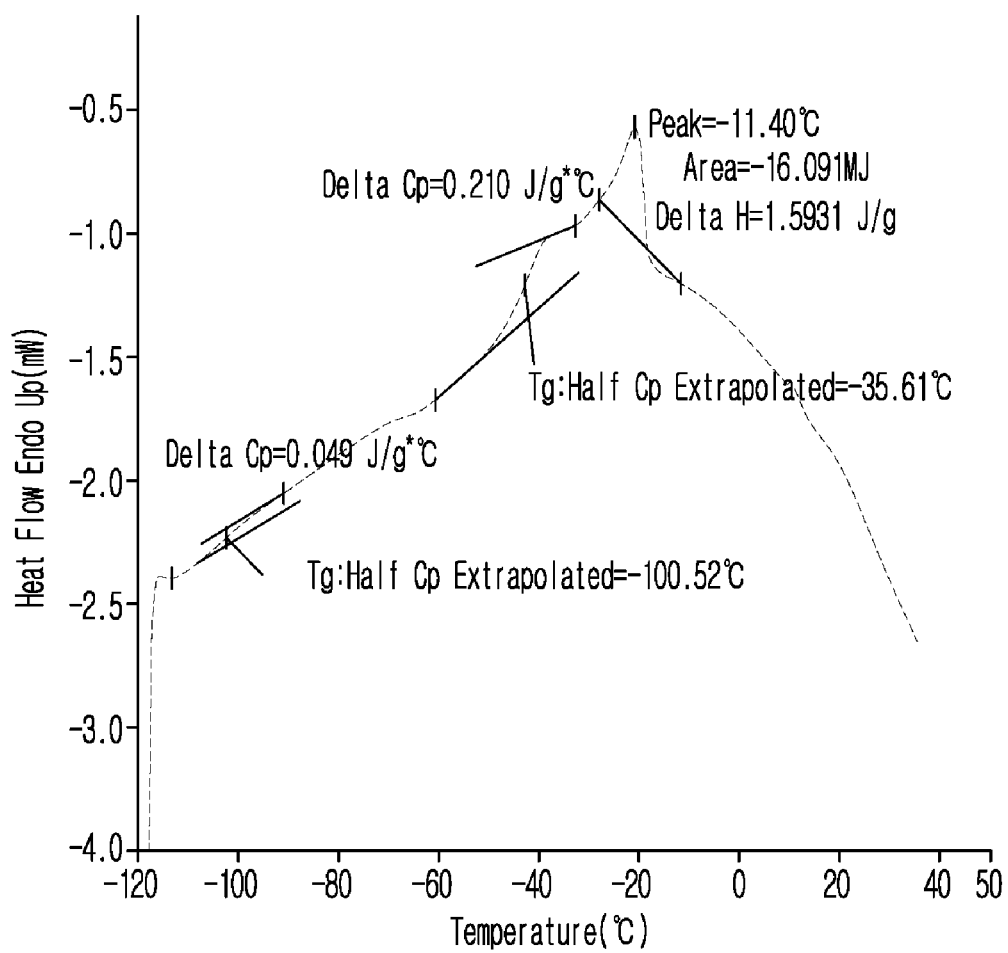

FIG. 2 is a set of graphs of DSC analysis results of the rubber compositions according to (a) Preparation Example 1 and (b) Comparative Preparation Example 1. Referring to (b) of FIG. 2, it can be confirmed that peaks corresponding to the glass transition temperature and the melting point of KBR-01 used as BR are exhibited at about −110° C. and −11° C. Referring to (a) of FIG. 2, it can be confirmed that the peaks observed in (b) of FIG. 2 have disappeared, and thus a single glass transition temperature is exhibited.

Accordingly, it can be experimentally confirmed that when the copolymer according to an example of the present invention is used to prepare a rubber composition, compatibility with SBR, BR, and a reinforcing agent is excellent.

A method of preparing a copolymer according to one aspect of the present invention produces a block copolymer composed of a first part and a second part through a reaction with one or more of a second randomizing agent and an additional aromatic vinyl monomer, so that compatibility and bonding strength of the copolymer with SBR, BR, and a reinforcing agent can be enhanced upon the preparation of a rubber composition.

In addition, a rubber composition according to another aspect of the present invention includes the above-described copolymer, so that mechanical properties, abrasion properties, and dynamic properties can be enhanced.

Effects of the present invention are not limited to the above-described effects and it should be understood that all effects that can be inferred from a configuration of the invention disclosed in the detailed descriptions or claims of the present invention are encompassed.

The above description of the present invention is only exemplary, and it will be understood by those skilled in the art that various modifications can be made without departing from the scope of the present invention and changing essential features. Therefore, the above-described embodiments should be considered as only illustrative in all aspects and not for purposes of limitation. For example, each component described as a single type may be realized in a distributed manner, and similarly, components that are described as being distributed may be realized in a coupled manner.

The scope of the present invention is defined by the appended claims and encompasses all modifications and alterations derived from meanings, the scope and equivalents of the appended claims.

What is claimed is:

1. A method of preparing a copolymer, the method comprising:
    (a) polymerizing an aromatic vinyl monomer and a conjugated diene-based monomer with a solvent, a first randomizing agent, and a catalyst to prepare a first copolymer including the aromatic vinyl monomer in an amount of 15 to 40 wt %; and
    (b) reacting the first copolymer with one or more of a second randomizing agent different from the first randomizing agent and an additional aromatic vinyl monomer to prepare a second copolymer.

2. The method of claim 1, wherein the solvent is selected from the group consisting of benzene, methylbenzene, heptane, n-hexane, cyclohexane, and a mixture of two or more thereof.

3. The method of claim 1, wherein the first randomizing agent is selected from the group consisting of ditetrahydrofurylpropane (DTHFP), tetramethylethylenediamine (TEMDA), sodium t-amylate (STA), and a mixture of two or more thereof.

4. The method of claim 1, wherein the catalyst is selected from the group consisting of ethyllithium, propyllithium, isopropyllithium, n-butyllithium, sec-butyllithium, pentyllithium, hexyllithium, cyclohexyllithium, phenyllithium, and a mixture of two or more thereof.

5. The method of claim 1, wherein the aromatic vinyl monomer is selected from the group consisting of styrene, α-methylstyrene, α-ethylstyrene, p-methylstyrene, vinyltoluene, and a mixture of two or more thereof.

6. The method of claim 1, wherein the conjugated diene-based monomer is selected from the group consisting of 1,3-butadiene, 2,3-dimethyl-1,3-butadiene, piperylene, 3-butyl-1,3-octadiene, isoprene, 2-phenyl-1,3-butadiene, and a mixture of two or more thereof.

7. The method of claim 1, wherein the second randomizing agent is selected from the group consisting of tert-butoxyethoxy ethane, tetrahydrofuran, triethylamine, and a mixture of two or more thereof.

8. The method of claim 1, wherein the second copolymer includes a first part comprising the first copolymer and a second part excluding the first part, and the second part includes the aromatic vinyl monomer in an amount of 30 to 40 wt %.

9. The method of claim 8, wherein a weight ratio of the aromatic vinyl monomer included in the first part and the second part is 1:1.2 to 2.0.

10. The method of claim 1, wherein, the aromatic vinyl monomer is used in the step (a) in an amount of 30 to 50 wt % with respect to a total weight of the aromatic vinyl monomer used in the steps (a) and (b).

11. The method of claim 1, further comprising (c) reacting the second copolymer with a silane-based coupling agent after the step (b).

12. The method of claim 11, wherein the silane-based coupling agent is selected from the group consisting of 3-glycidoxypropyl dimethyl dimethoxysilane (GPDMS), dimethyl dichlorosilane, trimethyl chlorosilane, methyl dichlorosilane, methyl trichlorosilane, phenyl trichlorosilane, vinyl trichlorosilane, and a mixture of two or more thereof.

13. A rubber composition comprising:
    a copolymer prepared by the method of claim 1; and
    styrene-butadiene rubber and butadiene rubber.

* * * * *